United States Patent
Han et al.

(10) Patent No.: US 9,596,028 B2
(45) Date of Patent: Mar. 14, 2017

(54) METHOD AND CONTROLLER FOR COMMISSIONING WAVELENGTH DIVISION MULTIPLEXING OPTICAL NETWORK DURING CAPACITY EXPANSION

(71) Applicant: HUAWEI TECHNOLOGIES CO., LTD., Shenzhen (CN)

(72) Inventors: Jianrui Han, Shenzhen (CN); Mingming Xu, Chengdu (CN); Lei Shi, Chengdu (CN); Lin Tan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 188 days.

(21) Appl. No.: 14/269,408

(22) Filed: May 5, 2014

(65) Prior Publication Data

US 2014/0241715 A1 Aug. 28, 2014

Related U.S. Application Data

(63) Continuation of application No. PCT/CN2012/076515, filed on Jun. 6, 2012.

(30) Foreign Application Priority Data

Nov. 3, 2011 (CN) .......................... 2011 1 0343618

(51) Int. Cl.
*H04B 10/079* (2013.01)
*H04J 14/02* (2006.01)
*H04B 10/294* (2013.01)

(52) U.S. Cl.
CPC ..... *H04B 10/07955* (2013.01); *H04B 10/294* (2013.01); *H04J 14/0221* (2013.01); *H04J 14/0282* (2013.01)

(58) Field of Classification Search
CPC .................................................. H04J 14/0221
See application file for complete search history.

(56) References Cited

U.S. PATENT DOCUMENTS

| 7,522,846 B1 | 4/2009 | Lewis et al. |
| 2007/0014571 A1* | 1/2007 | Roberts ............. H04B 10/0793 398/25 |

(Continued)

FOREIGN PATENT DOCUMENTS

| CA | 2 294 555 | 6/2001 |
| CN | 101364845 | 2/2009 |

(Continued)

OTHER PUBLICATIONS

Extended and Supplementary European Search Report issued on Nov. 5, 2014 in corresponding European Patent Application No. 12846328.8.

(Continued)

*Primary Examiner* — David Payne
*Assistant Examiner* — Casey Kretzer
(74) *Attorney, Agent, or Firm* — Staas & Halsey LLP

(57) ABSTRACT

The present invention discloses a method and a controller for commissioning a wave division multiplexing optical network during capacity expansion. The method includes: calculating, according to a preset rule, initial power of a wavelength service to be added and adding one or more wavelength services according to the initial power; detecting power of each newly-added wavelength service in transmission and separately calculating target power of each newly-added wavelength service according to a detected value and the initial power; calculating end-to-end performance of an existing wavelength service and end-to-end performance of each newly-added wavelength service when each newly-added wavelength service reaches its respective target power; and adjusting the power of each newly-added wave- (Continued)

length service when each newly-added wavelength service reaches its respective target power and the end-to-end performance of the existing wavelength service and the end-to-end performance of each newly-added wavelength service meets their respective lowest threshold requirements.

10 Claims, 4 Drawing Sheets

(56) References Cited

U.S. PATENT DOCUMENTS

| | | |
|---|---|---|
| 2009/0290870 A1 | 11/2009 | Koyano et al. |
| 2010/0239263 A1 | 9/2010 | Tokura et al. |
| 2011/0243555 A1* | 10/2011 | Callan ............... H04J 14/0221 398/38 |
| 2014/0029937 A1 | 1/2014 | Shi et al. |

FOREIGN PATENT DOCUMENTS

| | | |
|---|---|---|
| CN | 101449494 | 6/2009 |
| CN | 101807958 | 8/2010 |
| CN | 102142903 | 8/2011 |
| WO | WO 01/82516 A1 | 11/2001 |
| WO | WO 03/088542 A1 | 10/2003 |
| WO | WO 2009/144454 A1 | 12/2009 |

OTHER PUBLICATIONS

Chinese Office Action dated Feb. 28, 2015 in Chinese Patent Application No. 201110343618.4.
International Search Report mailed Sep. 6, 2012 in corresponding International Patent Application No. PCT/CN2012/076515.
PCT International Search Report and Written Opinion of the International Searching Authority dated Sep. 6, 2012 in corresponding International Patent Application No. PCT/CN2012/076515.

* cited by examiner

METHOD AND CONTROLLER FOR COMMISSIONING WAVELENGTH DIVISION MULTIPLEXING OPTICAL NETWORK DURING CAPACITY EXPANSION

CROSS-REFERENCE TO RELATED APPLICATIONS

This application is a continuation of International Application No. PCT/CN2012/076515, filed on Jun. 6, 2012, which claims priority to Chinese Patent Application No. 201110343618.4, filed on Nov. 3, 2011, both of which are hereby incorporated by reference in their entireties.

TECHNICAL FIELD

The present invention relates to the field of optical communications, and in particular, to a method and a controller for commissioning a wavelength division multiplexing optical network during capacity expansion.

BACKGROUND

Optical signals inside a WDM (Wavelength Division Multiplex, wavelength division multiplexing) optical network may be multiplexed, transmitted, amplified, routed, and restored in an optical domain, so that the WDM optical network has become a hot topic for research in the field of optical communications. A WDM optical network may be classified into two types, a Transparent (transparent) optical network and an Opaque (opaque) optical network, according to whether a network element on the WDM optical network is capable of performing electrical processing on an optical signal. On a Transparent optical network, an optical signal always maintains the form of an optical signal in a process of transmission from an ingress network element to an egress network element, and experiences signal regeneration, exchange, and wavelength conversion in the optical domain.

Optical signals of different wavelengths may cause different physical effects to devices such as a fiber and an optical component used on a Transparent optical network. For example, optical signals of different wavelengths may cause different gains of an EDFA (Erbium Doped Fiber Amplifier, erbium doped fiber amplifier), and optical signals of different wavelengths may also cause different attenuation of a fiber. Therefore, after optical signals are transmitted on a WDM optical network, performance of optical signals transmitted on different channels is no longer balanced and consequently quality of optical signals received on an egress network element is not ideal. In addition, optical signals of a wavelength newly added on the network or adjustment of the power of optical signals of an existing wavelength on the network may also affect performance of optical signals of other wavelengths on the network, probably causing quality degradation of optical signals of some wavelengths on the network.

For the preceding reason, to ensure quality of optical signals on a network, there must be an appropriate mechanism to properly set and adjust optical parameters on the network.

In the prior art, a feedback-based adjustment manner is applied generally. It is specifically as follows: A performance detecting unit is placed at a receive end or on an intermediate network element to detect optical parameters of optical signals on a network, and a monitoring result of the performance detecting unit is used to guide an adjustable unit to adjust optical parameters of optical signals transmitted on the network accordingly; and generally the adjustment is performed by step, that is, adjustment is performed by a small step each time and the adjustment is completed once or by multiple times. For adjustment by a small step each time, a detection result is acquired by the detecting unit, and it is determined, according to the monitoring result, whether the adjustment is complete or performance degradation occurs, and if the adjustment is incomplete or performance degradation occurs, the adjustment continues till a commissioning goal is accomplished, or commissioning is completed or stopped according to the monitoring result.

However, when the preceding feedback-based adjustment manner is used, an adjustment pace can hardly be determined. If the selected adjustment pace is inappropriate, the adjustment is probably too slow. In this way, optical parameters of optical signals on the network need to be adjusted time and again, and then other optical signals already provisioned on the network may be affected.

SUMMARY

To conquer the excessively slow adjustment or the influence on other provisioned optical signals that may probably caused by the preceding feedback-based adjustment, embodiments of the present invention provide a method and a controller for commissioning a wavelength division multiplexing optical network during capacity expansion. The technical solutions are as follows:

A method for commissioning a wavelength division multiplexing optical network during capacity expansion, including:

calculating, according to a preset rule, initial power of a wavelength service to be added and adding one or more wavelength services according to the initial power;

detecting power of each newly-added wavelength service in transmission and separately calculating target power of each newly-added wavelength service according to a detected value and the initial power;

calculating end-to-end performance of an existing wavelength service and end-to-end performance of each newly-added wavelength service when each newly-added wavelength service reaches its respective target power; and adjusting the power of each newly-added wavelength service when each newly-added wavelength service reaches its respective target power and the end-to-end performance of the existing wavelength service and the end-to-end performance of each newly-added wavelength service meet their respective lowest threshold requirements, where the adjusting the power of each newly-added wavelength service includes:

sequentially using the newly-added wavelength services as newly-added wavelength services currently to be commissioned and performing the following operations:

calculating the end-to-end performance of the existing wavelength service when the newly-added wavelength services currently to be commissioned reach their target power; and adjusting power of the newly-added wavelength services currently to be commissioned to their target power when the newly-added wavelength services currently to be commissioned reach their target power and the end-to-end performance of the existing wavelength service meets its lowest threshold requirement.

A controller, including a service provisioning module, a first calculating module, a second calculating module, and a commissioning module, where:

the service provisioning module is configured to calculate, according to a preset rule, initial power of a wavelength service to be added and add one or more wavelength services according to the initial power;

the first calculating module is configured to detect power of each newly-added wavelength service in transmission and separately calculate, according to a detected value and the initial power, target power of each newly-added wavelength service provisioned by the service provisioning module;

the second calculating module is configured to calculate end-to-end performance of an existing wavelength service and end-to-end performance of each newly-added wavelength service when each newly-added wavelength service provisioned by the service provisioning module reaches its respective target power; and the commissioning module is configured to, when each newly-added wavelength service reaches its respective target power and the end-to-end performance of the existing wavelength service and the end-to-end performance of each newly-added wavelength service meet their respective lowest threshold requirements, adjust power of each newly-added wavelength service provisioned by the service provisioning module, where when the commissioning module adjust the power of each newly-added wavelength service provisioned by the service provisioning module, it includes: a control unit, configured to sequentially use the newly-added wavelength services as newly-added wavelength services currently to be commissioned and instruct a calculating unit and an adjusting unit to start working; the calculating unit, configured to calculate the end-to-end performance of the existing wavelength service when the newly-added wavelength services currently to be commissioned reach their target power; and the adjusting unit, configured to adjust power of the newly-added wavelength services currently to be commissioned to their target power when the newly-added wavelength services currently to be commissioned reach their target power and the end-to-end performance, obtained by the calculating unit, of the existing wavelength service meets its lowest threshold requirement.

The technical solutions provided in the embodiments of the present invention bring the following beneficial effects: through the technical solutions of calculating, according to a preset rule, initial power of a wavelength service to be added, adding one or more wavelength services according to the initial power, and then adjusting power of each newly-added wavelength service, the newly-added wavelength service imposes no impact to performance of an existing wavelength service on a network, thereby effectively improving commissioning efficiency.

BRIEF DESCRIPTION OF DRAWINGS

To illustrate the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention more comprehensible, the following further describes embodiments of the present invention in detail with reference to the accompanying drawings.

Embodiment 1

Figure 1:
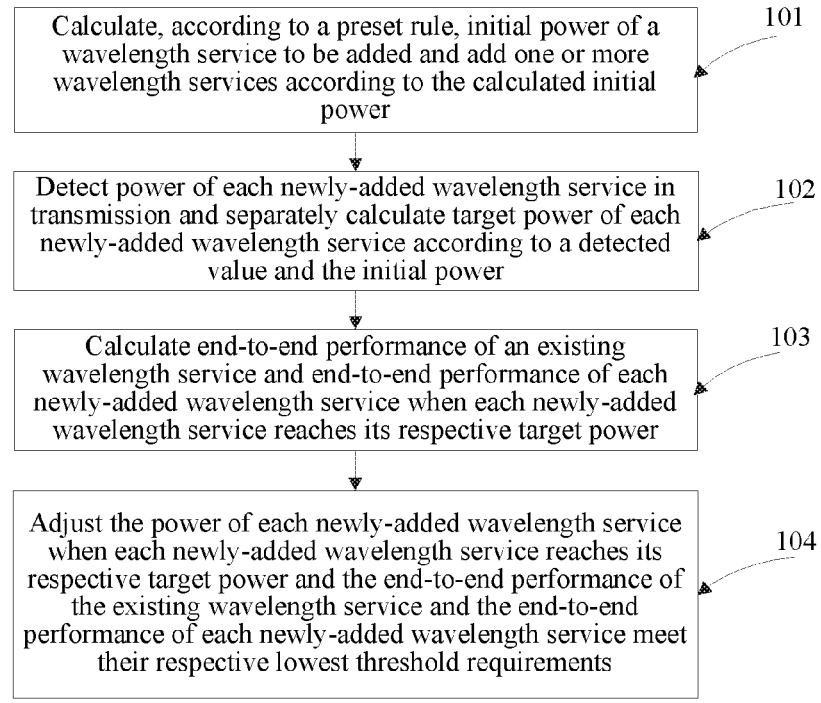
FIG. 1 is a flowchart of a method for commissioning a WDM optical network during capacity expansion according to Embodiment 1 of the present invention.

Refer to FIG. 1. A method for commissioning a WDM optical network during capacity expansion specifically includes the following steps:

Step 101: Calculate, according to a preset rule, initial power of a wavelength service to be added and add one or more wavelength services according to the calculated initial power.

Step 102: Detect power of each newly-added wavelength service in transmission and separately calculate target power of each newly-added wavelength service according to a detected value and the initial power.

Step 103: Calculate end-to-end performance of an existing wavelength service and end-to-end performance of each newly-added wavelength service when each newly-added wavelength service reaches its respective target power.

Step 104: Adjust the power of each newly-added wavelength service when each newly-added wavelength service reaches its respective target power and the end-to-end performance of the existing wavelength service and the end-to-end performance of each newly-added wavelength service meet their respective lowest threshold requirements.

Specifically, adjusting the power of each newly-added wavelength service includes:

sequentially using the newly-added wavelength services as newly-added wavelength services currently to be commissioned and performing the following operations:

calculating the end-to-end performance of the existing wavelength service when the newly-added wavelength services currently to be commissioned reach their target power; and adjusting power of the newly-added wavelength services currently to be commissioned to their target power when the newly-added wavelength services currently to be commissioned reach their target power and the end-to-end performance of the existing wavelength service meets its lowest threshold requirement.

The technical solution provided in this embodiment of the present invention brings the following beneficial effects: through the technical solutions of calculating, according to a preset rule, initial power of a wavelength service to be added, adding one or more wavelength services according to the initial power, and then adjusting power of each newly-added wavelength service, the newly-added wavelength service imposes no impact to performance of an existing wavelength service on a network, thereby effectively improving commissioning efficiency.

Embodiment 2

Figure 2:
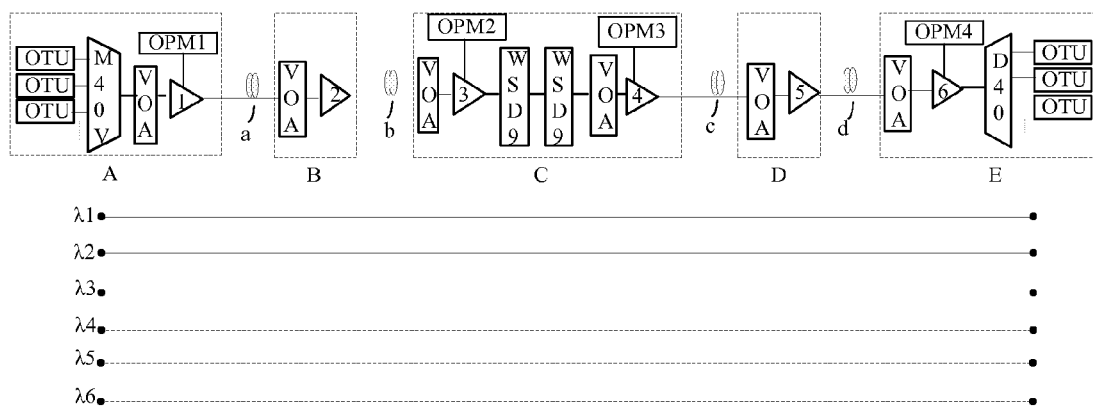
FIG. 2 is a schematic diagram of a WDM optical network system according to Embodiment 2 of the present invention.

Refer to FIG. 2, which is an exemplary diagram of an architecture of a WDM (Wavelength Division Multiplex, wavelength division multiplexing) optical network system according to an embodiment of the present invention. The system includes five stations A, B, C, D, and E in total. A and E are OTM (Optical Terminal Multiplexer, optical terminal multiplexer) stations, B and D are OLA (Optical Line Amplifier, optical line amplifier) stations, and C is a ROADM (Reconfigurable Optical Add-Drop Multiplexer, reconfigurable optical add-drop multiplexer) station. The stations A, B, C, D, and E are connected to each other by using fibers a, b, c, and d. The lengths of a, b, c, and d each may be specifically 80 km.

The following specifically describes a specific structure and a corresponding function of each of the preceding stations.

The station A includes an OTU (Optical Transponder Unit, optical transponder unit), an M40V (40-channel Multiplexing Board with VOA, 40-channel multiplexing board with VOA), a VOA (Variable Optical Attenuator, variable optical attenuator), and an optical amplifier board (marked with 1 in the figure). The OTU provides an access interface for a wavelength service that needs to be transmitted in the system; the M40V board is capable of multiplexing at most 40 channels of wavelength services, accessed from OTUs, with standard wavelengths that comply with a requirement of a WDM optical network system into one channel of multiplexed signals, and is capable of adjusting power of each channel of wavelength service; the VOA board is capable of adjusting power of input wavelength services; and the optical amplifier board is capable of amplifying signals of wavelength services and then outputting them to a next station of the system.

A path along which wavelength services are transmitted in the station A is as follows: The OTU boards convert accessed services into optical signals with standard wavelengths that comply with the requirement of the WDM optical network system; when various channels of wavelength services accessed from the OTUs pass through the M40V, the M40V multiplexes these channels of wavelength services into one channel of multiplexed signal, adjusts input power of each channel of wavelength service by setting an attenuation value of each individual channel, and then outputs the multiplexed signal to the VOA; the VOA may adjust power of the input multiplexed optical signal and outputs the adjusted signal to the optical amplifier board (a device marked with 1 in FIG. 2); and the optical amplifier board amplifies the input multiplexed optical signal, and then outputs the signal to the next station B by using the fiber a.

The station B specifically includes a VOA and an optical amplifier board (marked with 2 in the figure). The VOA and the optical amplifier board in the station B have the same functions as the VOA and the optical amplifier board in the station A, respectively, and no further details are provided herein.

The station B performs power adjustment and signal amplification on the received multiplexed optical signal, and then outputs it to the next station C by using the fiber b.

The station C specifically includes a VOA, two optical amplifier boards (marked with 3 and 4 in the figure), a WSD9 (9-port wavelength selective switching demultiplexing board, 9-port wavelength selective switching demultiplexing board), and a WSM9 (9-port wavelength selective switching multiplexing board, 9-port wavelength selective switching multiplexing board). The VOA and the optical amplifier board in the station C have the same functions as the VOA and the optical amplifier board in the station A, respectively, and no further details are provided herein. The WSD9 and the WSM9 cooperate with each other to schedule wavelengths inside the station in the WDM optical network system. In addition, both the WSD9 and the WSM9 are capable of adjusting input power of each channel.

The station C performs power adjustment, wavelength scheduling, and signal amplification on the received multiplexed optical signal, and then transmits it to the next station D by using the fiber c.

The station D includes a VOA and an optical amplifier board (marked with 5 in the figure). The VOA and the optical amplifier board in the station D have the same functions as the VOA and the optical amplifier board in the station A, respectively, and no further details are provided herein.

The station D performs power adjustment and signal amplification on the received multiplexed optical signal, and then transmits it to the next station E by using the fiber d.

The station E includes a VOA, an optical amplifier board (marked with 6 in the figure), a D40 (40-channel demultiplexing board, 40-channel demultiplexing board), and an OTU. The VOA and the optical amplifier board in the station E have the same functions as the VOA and the optical amplifier board in the station A, respectively, and no further details are provided herein; the D40 is capable of demultiplexing one channel of optical signal to at most 40 channels of optical signals with standard wavelengths that comply with a requirement of a WDM system; and a wavelength service in the WDM optical network system is output through an OTU.

After the station E performs power adjustment and signal amplification on the received multiplexed optical signal, the D40 demultiplexes the multiplexed optical signal to obtain various channels of wavelength services, and then the obtained various channels of wavelength services are output to users through OTUs.

Furthermore, the stations A, C, and E each further include an OPM (Optical Performance Monitor, optical performance monitor) marked with OPM1, OPM2, OPM3, and OPM4, which are connected to the optical amplifier boards 1, 3, 4, and 6 respectively to monitor power of each channel of wavelength service among multiplexed optical signals that pass through the optical amplifier boards.

As shown in FIG. 2, $\lambda 1$, $\lambda 2$, $\lambda 3$, $\lambda 4$, $\lambda 5$, and $\lambda 6$ indicate wavelength services transmitted on the WDM optical network.

It should be stressed that the above is only an instance of a WDM optical network system so as to explain this embodiment of the present invention but shall not be construed as a limitation on the present invention. Instead, the present invention also applies to various WDM optical networks including other network elements.

Figure 3A:
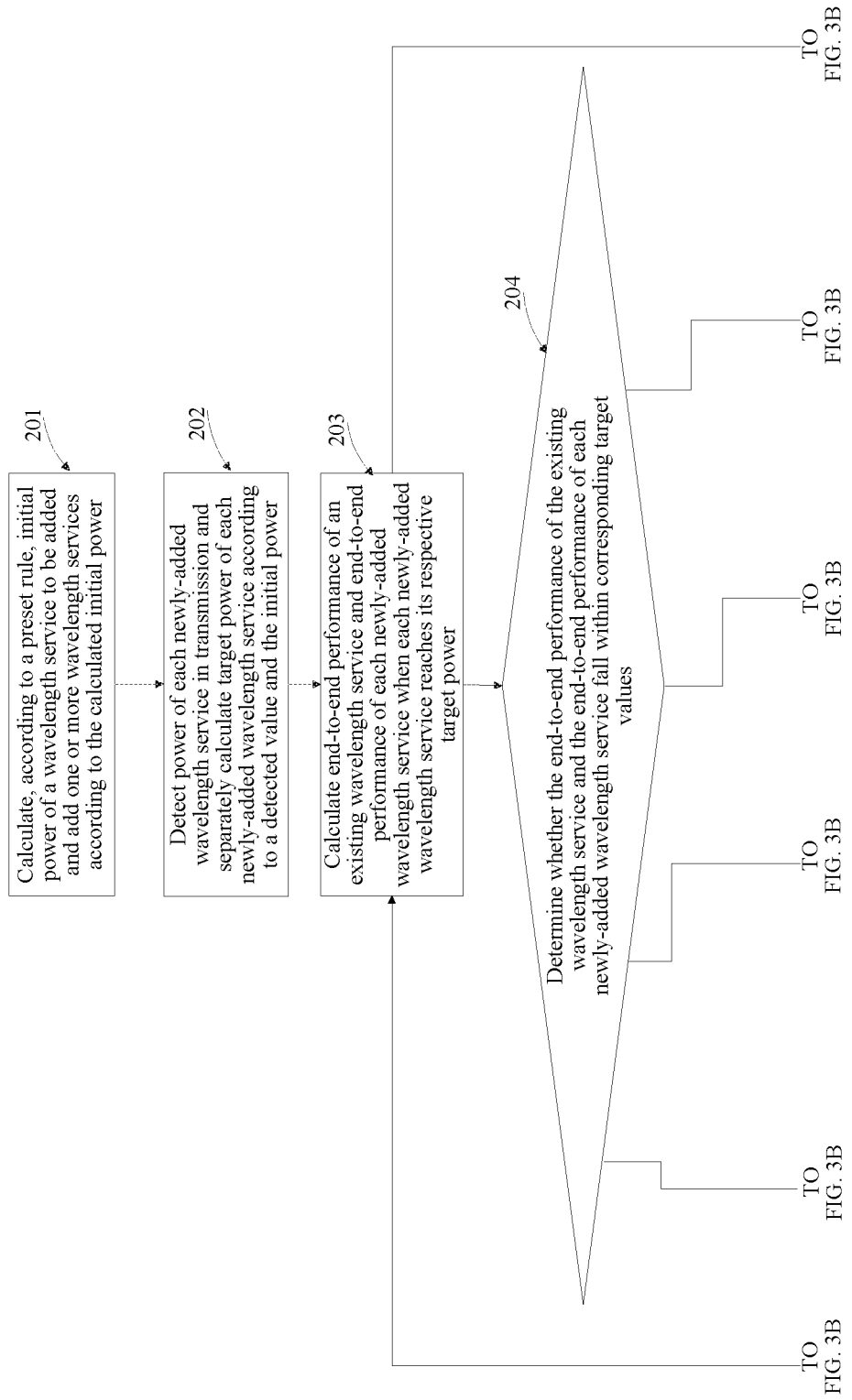
FIGS. 3A and 3B are a flowchart of a method for commissioning a WDM optical network during capacity expansion according to Embodiment 2 of the present invention.
Figure 3B:
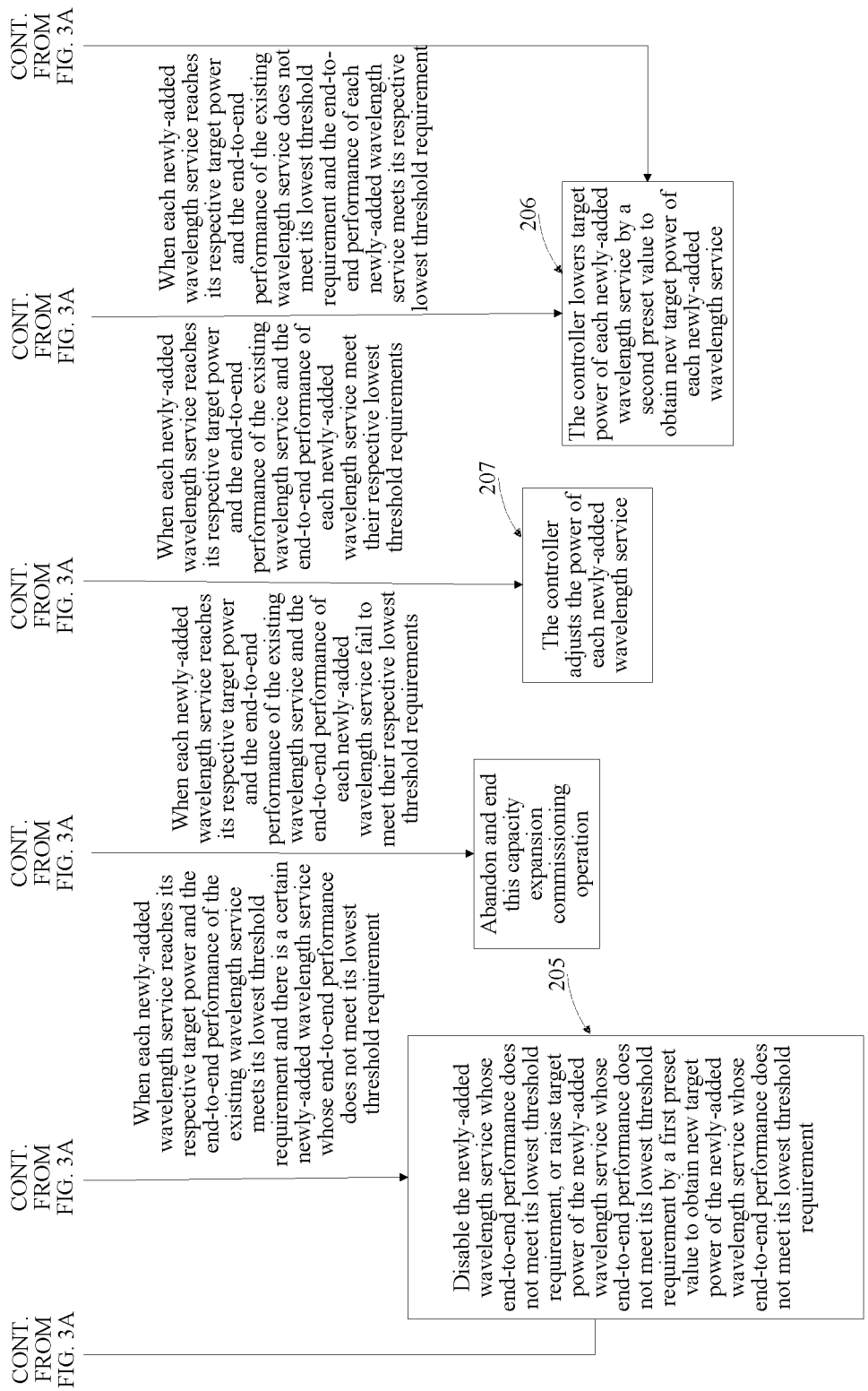

When a new wavelength service is added in the WDM optical network system, it is necessary to ensure that the newly-added wavelength service does not affect end-to-end performance of an existing wavelength service while end-to-end performance of the newly-added wavelength service is ensured as much as possible. Therefore, power of a newly-added wavelength service on a network needs to be adjusted as follows:

Refer to FIG. 3, an embodiment of the present invention provides a method for commissioning a WDM optical network during capacity expansion. The method may apply to a network system structure shown in FIG. 2 and specifically includes the following steps:

In this embodiment of the present invention, power of a newly-added wavelength service on a WDM optical network is commissioned section by section. Here, each commissioned section is called an OMS (Optical Multiplex Section, optical multiplex section), and a receive/transmit network element on each OMS is configured with a unit having an optical performance detection function. In this embodiment of the present invention, two network elements located at a transmit end and a receive end of an OMS are called a first network element and a second network element, respectively. A newly-added wavelength service is transmitted from the first network element to the second network element. By taking the WDM optical network system shown in FIG. 2 as an example, commissioned sections are A-C and C-E if a transmission path of the newly-added wavelength service is A-B-C-D-E. For the commissioned section A-C, the station A is called the first network element and the station C is called the second network element; while for the commissioned section C-E, the station C is called the first network element and the station E is called the second network element. In this embodiment of the present invention, the following method applies to any commissioned section to commission the power of a newly-added wavelength service on a WDM optical network:

Step 201: A controller calculates, according to a preset rule, initial power of a wavelength service to be added and adds one or more wavelength services according to the initial power.

Specifically, the calculating, by a controller according to a preset rule, initial power of a wavelength service to be added and adding one or more wavelength services according to the initial power includes the following two manners:

Manner 1: The controller controls the first network element to monitor power of existing wavelength services; calculates average power of the existing wavelength services according to a detection result of the first network element; uses power which is lower than the average power by a preset ratio as the initial power; and controls the first network element to add one or more wavelength services according to the initial power.

For a newly-added wavelength service whose transmission path is A-B-C-D-E in the WDM optical network system shown in FIG. 2, the commissioned section A-C is used as an example to describe Manner 1, where the station A is the first network element and the station C is the second network element.

In the WDM optical network system shown in FIG. 2, there are existing wavelength services λ1, λ2, and λ3, whose transmission paths are all A-B-C-D-E. The controller controls OPM1 in the station A to detect that the output power of the existing wavelength services λ1, λ2, and λ3 in the optical amplifier board 1 is +1 dBm, +1 dBm, and +1 dBm, respectively; calculates average power of the existing wavelength services as +1 dBm; uses power which is 25% lower than the average power as the initial power, where 25% needs to be converted in a unit of dB, that is, 10l g0.25, namely, −6 dB, and the initial power is +1−6=−5 dBm; and controls the station A to access one or more wavelength services from the OTUs according to the initial power of −5 dBm. For example, the controller controls the station A to add three wavelength services λ4, λ5, and λ6 from the OTUs according to the initial power −5 dB, where the transmission path is A-B-C-D-E.

Manner 2: The controller uses power which is lower than typical power of an optical amplifier board in the first network element by a preset ratio as the initial power and controls the first network element to add one or more wavelength services according to the calculated initial power, where the typical power is standard output power of the optical amplifier board in the first network element.

For a newly-added wavelength service whose transmission path is A-B-C-D-E in the WDM optical network system shown in FIG. 2, the commissioned section A-C is used as an example to describe Manner 2, where the station A is the first network element and the station C is the second network element.

If typical single-wave optical output power of the optical amplifier board in the station A is +1 dBm and the controller uses power that is 25% lower than the typical power of the optical amplifier board in the station A as the initial power, the initial power is −5 dBm. The controller controls the station A to access one or more wavelength services from the OTUs according to the initial power −5 dBm. For example, the controller controls the station A to add three wavelength services λ4, λ5, and λ6 from the OTUs according to the initial power −5 dBm, where the transmission path is A-B-C-D-E.

In general, average power of wavelength services that pass through the optical amplifier board in the station A is equal to the typical power of the optical amplifier board in the station A.

The preset ratio is a value between 0 and 1. Preferredly, the preset ratio is a value in a preferred range. Here, the preferred range is obtained through a plenty of emulation tests and is a subset between 0 and 1. When the preset range is a value in the preferred range, interference caused by a wavelength service newly added according to the initial power to an existing wavelength service in the system is smaller than that when the preset ratio is a value beyond the preferred range. For example, the preferred range is 20% to 25% according to emulation tests.

Here, one or more wavelength services are newly added by using power which is lower than average power or typical power by a preset ratio as the initial power due to the following reason: According to a plenty of experiments, performance of an existing wavelength service in the system may be largely affected when a wavelength service is newly added in a WDM optical network system by directly using power that is the same as power of the existing wavelength service, typical power, or greater power. This, however, is not acceptable to a user, and adding a wavelength service according to relatively small initial power imposes relatively small impact on the existing wavelength service in the system. Therefore, in this embodiment of the present invention, a wavelength service is newly added by using the relatively small initial power and then the power of the newly-added wavelength service is adjusted. Step 202 gives a method for adjusting power of a newly-added wavelength service. The power of the newly-added wavelength service is adjusted due to the following reason: Although adding a wavelength service according to the relatively small initial power brings relatively small impact to the performance of the existing wavelength service in the system, a destination network element cannot be reached after the relatively small initial power is attenuated in a transmission process, or the destination network element can be reached but performance of the newly-added wavelength service cannot be ensured because the power of the newly-added wavelength service reaching the destination network element is relatively small; therefore, the power of the wavelength service newly added according to the relatively small initial power needs to be adjusted.

In this embodiment of the present invention, the controller may control first network elements in turn to add a wavelength service in the WDM optical network system or add two or more wavelength services at one time according to the initial power.

Specifically, the controller may control initial power of a newly-added wavelength service by controlling a single-channel attenuation value of an M40V in a first network element such as the station A, so that power of the newly-added wavelength service at the optical amplifier board 1 is the initial power.

In addition, it should be noted that, when the controller controls the first network element to add one or more wavelength services in the WDM optical network, a method for controlling the first network element in a first commissioned section to add a wavelength service is slightly different from a method for controlling a first network element in a second commissioned section and a subsequent commissioned section to add a wavelength service. Here, an example is given to describe the difference as follows:

Taking the WDM optical network system shown in FIG. 2 as an example, the controller controls the station A in the commissioned section A-C to add a wavelength service according to the initial power as follows: a laser of a corresponding wavelength is turned on, and transmission starts by setting a single-channel attenuator of the station A; and the controller controls the station C in the commissioned section C-E to add a wavelength service according to the initial power as follows: control attenuation values of the VOAs in the station C to re-provision the newly-added wavelength service, which is transmitted from the section A-C, to the station E according to the initial power. This is because initially no wavelength service is newly added for the first commissioned section, and therefore a wavelength service to be newly added needs to be added to a wavelength for transmission, while for the second, third, and subsequent commissioned sections, the newly-added wavelength service has already been transmitted from a preceding commissioned section and therefore for the second, third, and subsequent commissioned sections, the first network elements in the second, third, and subsequent commissioned sections only need to adjust attenuation values so that the transmitted newly-added wavelength service continues to be provisioned downward according to the initial power.

Step 202: The controller detects power of each newly-added wavelength service in transmission and separately calculates target power of each newly-added wavelength service according to a detected value and the initial power.

Specifically, detecting, by the controller, power of each newly-added wavelength service in transmission and separately calculating target power of each newly-added wavelength service according to a detected value and the initial power may be implemented by the following two manners:

Manner 1: Control the second network element to monitor the power of each newly-added wavelength service, and separately calculate the target power of each newly-added wavelength service according to a detected value detected by the second network element, the initial power, and the average power.

Specific operations in Manner 1 are as follows: The controller controls the second network element to monitor power of each newly-added wavelength service; deducts the initial power of a newly-added wavelength service from the detected value of the newly-added wavelength service to obtain a transmit-to-receive power ratio of the newly-added wavelength service in transmission; and deducts the transmit-to-receive power ratio from the average power to obtain the target power of the newly-added wavelength service.

For the newly-added wavelength services λ4, λ5, and λ6 whose transmission path is A-B-C-D-E in the WDM optical network system shown in FIG. 2, the commissioned section A-C is used as an example to describe Manner 1, where the station A is the first network element and the station C is the second network element.

For the newly-added wavelength service λ4, the OPM2 in the station C is controlled to detect that power of λ4 is −4.5 dBm. A transmit-to-receive power ratio of λ4 in the section A-C on the WDM optical network is calculated as 0.5 (−4.5−(−5)) according to the power of λ4 and initial power of λ4. Target power of λ4 is calculated as 0.5 (+1−0.5) dBm according to the transmit-to-receive power ratio of λ4 and the average power. Similarly, target power of the newly-added wavelength services λ5 and λ6 is calculated.

Manner 2: Control the second network element to monitor power of each newly-added wavelength service and separately calculate the target power of each newly-added wavelength service according to a detected value detected by the second network element, the initial power, and the typical power.

Specific operations in Manner 2 are as follows: The controller controls the second network element to monitor a detected value of power of each newly-added wavelength service; deducts the initial power of the newly-added wavelength service from the detected value of the newly-added wavelength service to obtain a transmit-to-receive power ratio of the newly-added wavelength service in transmission; and deducts the transmit-to-receive power ratio from the typical power to obtain the target power of the newly-added wavelength service.

For the newly-added wavelength services λ4, λ5, and λ6 whose transmission path is A-B-C-D-E in the WDM optical network system shown in FIG. 2, the commissioned section A-C is used as an example to describe Manner 2, where the station A is the first network element and the station C is the second network element.

For the newly-added wavelength service λ4, the OPM2 in the station C is controlled to detect that power of λ4 is −5 dBm. A transmit-to-receive power ratio of λ4 in the section A-C on the WDM optical network is calculated as 0 (−5−(−5)) according to the power of λ4 and initial power of λ4. Target power of λ4 is calculated as 1 (+1−0) dBm according to the transmit-to-receive power ratio of λ4 and the typical power. Similarly, target power of the newly-added wavelength services λ5 and λ6 is calculated.

Step 203: Calculate end-to-end performance of an existing wavelength service and end-to-end performance of each newly-added wavelength service when each newly-added wavelength service reaches its respective target power, where the end-to-end performance includes one or more of an OSNR (Optical Signal to Noise Ratio, optical signal to noise ratio), an OSNR margin, a bit error rate, a Q factor, and the like.

Specifically, when each newly-added wavelength service is adjusted to its respective target power, end-to-end performance of an existing wavelength service and end-to-end performance of each newly-added wavelength service are calculated according to a physical damage model.

The damage model is a model used to calculate end-to-end performance of a wavelength service according to a given parameter when the wavelength service is actually not yet provisioned on a WDM optical network. It may be a mathematical model, an empirical formula obtained according to practical engineering experience and a theory, or a quantitative expression of physical damage during end-to-end transmission of a wavelength service on the WDM optical network. The given parameter includes a fiber level, a device level, network topology or service topology, and the like.

Step 204: The controller determines whether the end-to-end performance of the existing wavelength service and the end-to-end performance of each newly-added wavelength service fall within corresponding target values, when each newly-added wavelength service reaches its respective target power.

Step 205 is executed when each newly-added wavelength service reaches its respective target power and the end-to-end performance of the existing wavelength service meets its lowest threshold requirement and there is a newly-added wavelength service whose end-to-end performance does not meet its lowest threshold requirement.

Step 206 is executed when each newly-added wavelength service reaches its respective target power and the end-to-end performance of the existing wavelength service does not meet its lowest threshold requirement and the end-to-end performance of each newly-added wavelength service meets its respective lowest threshold requirement.

This capacity expansion commissioning operation is abandoned and ended when each newly-added wavelength service reaches its respective target power and the end-to-end performance of the existing wavelength service and the end-to-end performance of each newly-added wavelength service fail to meet their respective lowest threshold requirements.

Step 207 is executed when each newly-added wavelength service reaches its respective target power and the end-to-end performance of the existing wavelength service and the end-to-end performance of each newly-added wavelength service meet their respective lowest threshold requirements.

Step 203 and step 204 are described by using an example as follows:

By using the method described in step 202, target power of the newly-added wavelength services $\lambda 4$, $\lambda 5$, and $\lambda 6$ is calculated as +0.5 dBm, +1.0 dBm, and +1.5 dBm, respectively. Here, according to the method described in step 202, end-to-end performance of existing services $\lambda 1$, $\lambda 2$, and $\lambda 3$ is calculated according to the physical damage model when power of $\lambda 4$, $\lambda 5$, and $\lambda 6$ are set to +0.5 dBm, +1.0 dBm, and +1.5 dBm, respectively, where a lowest threshold requirement is 18. For example, OSNRs of $\lambda 1$, $\lambda 2$, and $\lambda 3$ from a transmit end A to a receive end E are calculated as 18, 18.2, and 18.5, respectively, all of which meet the lowest threshold requirement; and OSNRs of $\lambda 4$, $\lambda 5$, and $\lambda 6$ from the transmit end A to the receive end E are calculated as 18.5, 19.0, and 19.0, respectively, all of which meet the lowest threshold requirement. Therefore, the target power of $\lambda 4$, $\lambda 5$, and $\lambda 6$ in the optical amplifier board in the station A may be set to 0.5 dBm, 1 dBm, and 1.5 dBm, respectively.

Here, when each newly-added wavelength service reaches its respective target power, the end-to-end performance of the existing wavelength service and the end-to-end performance of each newly-added wavelength service are determined before the power of each newly-added wavelength service is adjusted. The purpose is to pre-estimate whether a new wavelength service can be added on the WDM optical network without affecting the performance of the existing wavelength service and whether the end-to-end performance of each newly-added service can meet its respective lowest threshold requirement. When it is pre-estimated that the newly-added wavelength service may not affect the performance of the existing service on the network and the end-to-end performance of each newly-added wavelength service meets its respective lowest threshold requirement, the power of each newly-added wavelength service is adjusted. When it is pre-estimated that the newly-added wavelength service may affect the performance of the existing wavelength service on the network and/or the end-to-end performance of each newly-added wavelength service fails to meet its respective lowest threshold requirement, the capacity expansion operation of the network is abandoned (for example, a wavelength service provisioned according to the initial power is disabled) or target power corresponding to each newly-added wavelength service is adjusted to avoid subsequent unnecessary service commissioning and difficulty in service commissioning.

Step 205: The controller disables a newly-added wavelength service whose end-to-end performance does not meet its lowest threshold requirement, or raises target power of a newly-added wavelength service whose end-to-end performance does not meet its lowest threshold requirement by a first preset value to obtain new target power of the newly-added wavelength service whose end-to-end performance does not meet its lowest threshold requirement; return to step 203 and end the operation till the end-to-end performance of the existing wavelength service and the end-to-end performance of each newly-added wavelength service meet or fail to meet their respective lowest threshold requirements.

Step 206: The controller lowers the target power of each newly-added wavelength service by a second preset value to obtain new target power of each newly-added wavelength service; return to step 203 and end the operation till the end-to-end performance of the existing wavelength service and the end-to-end performance of each newly-added wavelength service meet or fail to meet their respective lowest threshold requirements.

Step 207: The controller adjusts the power of each newly-added wavelength service.

This step specifically includes: sequentially using, by the controller, the newly-added wavelength services as newly-added wavelength services currently to be commissioned and performing the following operations:

calculating the end-to-end performance of the existing wavelength service when the newly-added wavelength services currently to be commissioned reach their target power, specifically: when the newly-added wavelength services currently to be commissioned reach their target power, calculating the end-to-end performance of the existing wavelength service according to the physical damage model, assuming that power of other newly-added wavelength services is the initial power and power of newly-added wavelength services already commissioned is the target power;

adjusting power of the newly-added wavelength services currently to be commissioned to their target power when the newly-added wavelength services currently to be commissioned reach their target power and the end-to-end performance of the existing wavelength service meets its west threshold requirement; and when the newly-added wavelength services currently to be commissioned reach their target power and the end-to-end performance of the existing wavelength service does not meet its lowest threshold requirement, disabling the newly-added wavelength services currently to be commissioned or lowering target power of the newly-added wavelength services currently to be commissioned by a third preset value to obtain new target power of the newly-added wavelength services currently to be commissioned; and returning to an operation of calculating, when the newly-added wavelength services currently to be commissioned reach their target power, the end-to-end performance of the existing wavelength service, till the end-to-end performance of the existing wavelength service meets its lowest threshold requirement.

This step is described specifically by using an example as follows:

If the controller controls the station A to adjust power of the newly-added wavelength service λ4 currently to be commissioned to +0.5 dBm, in the WDM optical network system shown in FIG. 2, OPM1 in the station A detects that the power of the existing wavelength services λ1, λ2, and λ3 in the optical amplifier board is +1 dBm, +1 dBm, and +1 dBm, respectively, the power of the newly-added wavelength service λ4 on the network is +0.5 dBm, and power of the newly-added wavelength services λ5 and λ6 is −5 dBm and −5 dBm, respectively.

End-to-end performance of λ1, λ2, and λ3 is calculated according to the physical damage model when the power of λ4 is 0.5 dBm and the power of λ5 and λ6 is the small power −5 dBm. Here, the end-to-end performance of λ1, λ2, and λ3 refers to OSNRs.

It is noted in advance that OSNRs of λ1, λ2, and λ3 in the optical amplifier board 1 are calculated by using an OSNR calculation formula under the precondition that a single-wave gain and noise figure of the optical amplifier board 1 in the station A are obtained.

Specifically, end-to-end OSNRs of λ1, λ2, and λ3 on multiple concatenated optical amplifier boards shown in FIG. 2 are obtained according to a concatenation formula; and it is determined whether the calculated end-to-end OSNRs of λ1, λ2, and λ3 meet a preset threshold requirement. If the OSNRs of λ1, λ2, and λ3 meet the preset threshold requirement, the station A is controlled to set the power of λ4 to +0.5 dBm. Specifically, the power of λ4 in the optical amplifier board 1 is controlled to be +0.5 dBm by controlling the station A to set an attenuation value of a VOA. If the end-to-end OSNRs of λ1, λ2, and λ3 fail to meet the preset threshold requirement, the target power of λ4 is lowered by a preset value to obtain new target power and the preceding process is repeated till the end-to-end OSNRs of λ1, λ2, and λ3 meet the preset threshold requirement.

The OSNR calculation formula is $$\frac{1}{OSNR_{out}} = \frac{1}{OSNR_{in}} + \frac{NFh\upsilon B}{P_{in}}.$$

$OSNR_{out}$ is an OSNR value of output signal light, $OSNR_{in}$ is an OSNR value of input signal light, NF is a noise figure of an optical amplifier board, $P_{in}$ is input optical power of the optical amplifier board, B is a filter bandwidth, h is a Planck constant, and v is a frequency of signal light.

This step further includes: calculating, when the newly-added wavelength services currently to be commissioned reach their target power, the end-to-end performance of the existing wavelength service, in addition to calculating the end-to-end performance of the newly-added wavelength services currently to be commissioned; pre-estimating whether the end-to-end performance of the newly-added wavelength services currently to be commissioned meets their respective lowest threshold requirements; and adjusting the power of the newly-added wavelength services currently to be commissioned to their target power when the end-to-end performance of the newly-added wavelength services currently to be commissioned meets their respective lowest threshold requirements.

The first preset value, the second preset value, and the third preset value mentioned previously may be set on users' own, which are not specifically limited in the present invention.

The controller mentioned in this embodiment of the present invention may be a device independent of a WDM optical network system or may be integrated in a certain network element of the WDM optical network system. In addition, some functions of the controller may be integrated in a certain network element of the WDM optical network system while other functions are integrated in another network element of the WDM optical network system. A specific implementation manner of the controller is not limited in this embodiment of the present invention.

Adjusting power of a newly-added wavelength service based on a combination of performance monitoring of an existing wavelength service and a damage model can really monitor performance of a wavelength service on a network, implement calculation by using the damage model and ensure that the newly-added wavelength service does not affect performance of the existing wavelength service on the network, thereby effectively improving commissioning efficiency.

Embodiment 3

Figure 4:
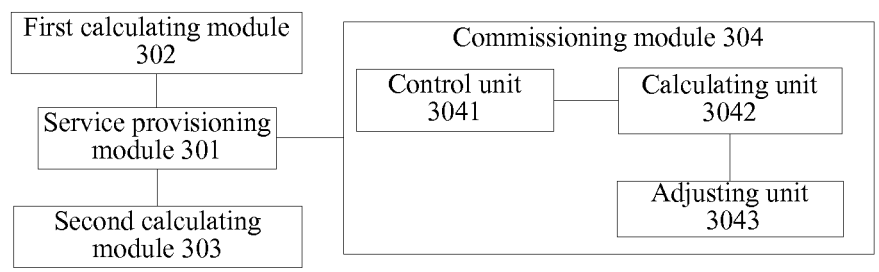
FIG. 4 is a controller according to Embodiment 3 of the present invention.

Refer to FIG. 4, which shows a controller. The controller may be specifically the same as the controller provided in the method embodiment and includes a service provisioning module 301, a first calculating module 302, a second calculating module 303, and a commissioning module 304, where:

the service provisioning module 301 is configured to calculate, according to a preset rule, initial power of a wavelength service to be added and add one or more wavelength services according to the initial power;

the first calculating module 302 is configured to detect power of each newly-added wavelength service in transmission and separately calculate, according to a detected value and the initial power, target power of each newly-added wavelength service provisioned by the service provisioning module 301;

the second calculating module 303 is configured to calculate end-to-end performance of an existing wavelength service and end-to-end performance of each newly-added wavelength service when each newly-added wavelength service provisioned by the service provisioning module 301 reaches its respective target power; and the commissioning module 304 is configured to, when each newly-added wavelength service reaches its respective target power and the end-to-end performance of the existing wavelength service and the end-to-end performance of each newly-added wavelength service meet their respective lowest threshold requirements, adjust power of each newly-added wavelength service provisioned by the service provisioning module 301.

Specifically, when the commissioning module 304 adjusts power of each newly-added wavelength service provisioned by the service provisioning module 301, it includes: a control unit 3041, configured to sequentially use the newly-added wavelength services as newly-added wavelength services currently to be commissioned and instruct a calculating unit 3042 and an adjusting unit 3043 to start working; the calculating unit 3042, configured to calculate the end-to-end performance of the existing wavelength service when the newly-added wavelength services currently to be commissioned reach their target power; and the adjusting unit 3043, configured to adjust power of the newly-added wavelength services currently to be commissioned to their target power when the newly-added wavelength services currently to be commissioned reach their target power and the end-to-end performance, obtained by the calculating unit 3042, of the existing wavelength service meets its lowest threshold requirement.

The service provisioning module 301 is specifically configured to control a first network element to monitor power of existing wavelength services, calculate average power of the existing wavelength services according to a detection result of the first network element, use power which is lower than the average power by a preset ratio as the initial power, and control the first network element to add one or more wavelength services according to the initial power; or the service provisioning module 301 is specifically configured to use power which is lower than typical power of an optical amplifier board in a first network element by a preset ratio as the initial power, and control the first network element to add one or more wavelength services according to the initial power, where the typical power is standard output power of an optical amplifier board in the first network element.

The first calculating module 302 is specifically configured to control a second network element to monitor the power of each newly-added wavelength service and separately calculate the target power of each newly-added wavelength service according to a detected value detected by the second network element, the initial power, and the average power; or the first calculating module 302 is specifically configured to control a second network element to monitor the power of each newly-added wavelength service and separately calculate the target power of each newly-added wavelength service according to a detected value detected by the second network element, the initial power, and the typical power.

The controller further includes:

a first adjusting module, configured to, when each newly-added wavelength service reaches its respective target power and the end-to-end performance of the existing wavelength service meets its lowest threshold requirement and there is a certain newly-added wavelength service whose end-to-end performance does not meet its lowest threshold requirement, disable the newly-added wavelength service whose end-to-end performance does not meet its lowest threshold requirement, or raise target power of the newly-added wavelength service whose end-to-end performance does not meet its lowest threshold requirement by a first preset value to obtain new target power of the newly-added wavelength service whose end-to-end performance does not meet its lowest threshold requirement; and instruct the second calculating module 303 to perform an operation of calculating, when each newly-added wavelength service provisioned by the service provisioning module 301 reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to meet their respective lowest threshold requirements;

a second adjusting module, configured to, when each newly-added wavelength service reaches its respective target power and the end-to-end performance of the existing wavelength service does not meet its lowest threshold requirement and the end-to-end performance of each newly-added wavelength service meets its respective lowest threshold requirement, lower the target power of each newly-added wavelength service by a second preset value to obtain new target power of each newly-added wavelength service; and instruct the second calculating module 303 to perform an operation of calculating, when each newly-added wavelength service provisioned by the service provisioning module 301 reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to meet their respective lowest threshold requirements; and a third adjusting module, configured to, when the calculating unit 3042 obtains that the newly-added wavelength services currently to be commissioned reach their target power and the end-to-end performance of the existing wavelength service does not meet its lowest threshold requirement, disable the newly-added wavelength services currently to be commissioned, or lower target power of the newly-added wavelength services currently to be commissioned by a third preset value to obtain new target power of the newly-added wavelength services currently to be commissioned; and instruct the calculating unit 3042 to perform an operation of calculating, when the newly-added wavelength services currently to be commissioned reach their target power, the end-to-end performance of the existing wavelength service, till the end-to-end performance of the existing wavelength service meets its lowest threshold requirement.

The technical solutions provided in this embodiment of the present invention bring the following beneficial effects: through the technical solution of calculating, according to a preset rule, initial power of a wavelength service to be added, adding one or more wavelength services according to the initial power, and then adjusting power of each newly-added wavelength service, the newly-added wavelength service imposes no impact to performance of an existing wavelength service on a network, thereby effectively improving commissioning efficiency.

The method embodiment and device embodiment of the present invention may provide a reference for each other. In particular, because an entire flow is already described in detail in the method but some details are not detailed in the device embodiment, a reference may be made to the method embodiment.

Persons of ordinary skill in the art may understand that all or a part of the steps in the embodiments may be implemented by hardware or by a program instructing relevant hardware. The program may be stored in a computer readable storage medium. The storage medium may be a read-only memory, a magnetic disk, an optical disk, or the like.

The foregoing description is merely exemplary embodiments of the present invention, but is not intended to limit the present invention. All modifications, equivalent replacements, improvements and the like made within the idea and principle of the present invention shall fall within the protection scope of the present invention.

What is claimed is:

1. A method for commissioning a wavelength division multiplexing optical network during capacity expansion, comprising:

calculating, according to a preset rule, initial power at a first network element of a wavelength service to be added;

adding one or more wavelength services at the first network element according to the initial power;

detecting power of each newly-added wavelength service in transmission at a second network element;

separately calculating target power of each newly-added wavelength service at the first network element according to a detected value at the second network element and the initial power at the first network element;

calculating end-to-end performance of an existing wavelength service and end-to-end performance of each newly-added wavelength service if each newly-added wavelength service reaches its respective target power; and when each newly-added wavelength service reaches its respective target power and the end-to-end performance of the existing wavelength service and the end-to-end performance of each newly-added wavelength service meet their respective lowest threshold requirements, sequentially using each newly-added wavelength service as a newly-added wavelength services currently to be commissioned and performing the following operations:

calculating the end-to-end performance of the existing wavelength service if the newly-added wavelength service currently to be commissioned reaches its target power; and adjusting power of the newly-added wavelength service currently to be commissioned to its target power when the newly-added wavelength service currently to be commissioned reaches its target power and the end-to-end performance of the existing wavelength service meets its lowest threshold requirement;

when each newly-added wavelength service reaches its respective target power and the end-to-end performance of the existing wavelength service does not meet its lowest threshold requirement and the end-to-end performance of each newly-added wavelength service meets its respective lowest threshold requirement, lowering the target power of each newly-added wavelength service by a second preset value to obtain new target power of each newly-added wavelength service; and returning to an operation of calculating, if each newly-added wavelength service reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to meet their respective lowest threshold requirements.

2. The method according to claim 1, wherein the calculating, according to a preset rule, initial power of a wavelength service to be added and adding one or more wavelength services according to the initial power comprises:

controlling the first network element to monitor power of existing wavelength services, calculating average power of the existing wavelength services according to a detection result of the first network element, using power that is lower than the average power by a preset ratio as the initial power, and controlling the first network element to add one or more wavelength services according to the initial power; or using power that is lower than typical power of an optical amplifier board in a first network element by a preset ratio as the initial power and controlling the first network element to add one or more wavelength services according to the initial power, wherein the typical power is standard output power of the optical amplifier board in the first network element.

3. The method according to claim 2, wherein the detecting power of each newly-added wavelength service in transmission and separately calculating target power of each newly-added wavelength service according to a detected value and the initial power comprises:

controlling the second network element to monitor the power of each newly-added wavelength service, and separately calculating the target power of each newly-added wavelength service according to a detected value detected by the second network element, the initial power, and the average power; or controlling a second network element to monitor the power of each newly-added wavelength service, and separately calculating the target power of each newly-added wavelength service according to a detected value detected by the second network element, the initial power, and the typical power.

4. The method according to claim 1, further comprising:

when each newly-added wavelength service reaches its respective target power and the end-to-end performance of the existing wavelength service meets its lowest threshold requirement and there is a certain newly-added wavelength service whose end-to-end performance does not meet its lowest threshold requirement, disabling the newly-added wavelength service whose end-to-end performance does not meet its lowest threshold requirement, or raising target power of the newly-added wavelength service whose end-to-end performance does not meet its lowest threshold requirement by a first preset value to obtain new target power of the newly-added wavelength service whose end-to-end performance does not meet its lowest threshold requirement; and returning to an operation of calculating, if each newly-added wavelength service reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to meet their respective lowest threshold requirements.

5. The method according to claim 1, further comprising:

when the newly-added wavelength service currently to be commissioned reaches its target power and the end-to-end performance of the existing wavelength service does not meet its lowest threshold requirement, disabling the newly-added wavelength service currently to be commissioned or lowering target power of the newly-added wavelength service currently to be commissioned by a third preset value to obtain new target power of the newly-added wavelength service currently to be commissioned; and returning to an operation of calculating, if the newly-added wavelength service currently to be commissioned reaches its target power, the end-to-end performance of the existing wavelength service, till the end-to-end performance of the existing wavelength service meets its lowest threshold requirement.

6. An optical network system, comprising:
a first network element; and
a second network element, wherein:
the first network element is configured to calculate, according to a preset rule, initial power of a wavelength service to be added;

the first network element is configured to add one or more wavelength services according to the initial power;

the second network element is configured to detect power of each newly-added wavelength service in transmission;

the second network element is configured to separately calculate, according to a detected value at the second network element and the initial power at the first network element, target power of each newly-added wavelength service at the first network element;

calculate, if each newly-added wavelength service reaches its respective target power, end-to-end performance of an existing wavelength service and end-to-end performance of each newly-added wavelength service; and when each newly-added wavelength service reaches its respective target power and the end-to-end performance of the existing wavelength service and the end-to-end performance of each newly-added wavelength service meet their respective lowest threshold requirements, sequentially use each newly-added wavelength service as a newly-added wavelength service currently to be commissioned and perform the following operations:

calculating the end-to-end performance of the existing wavelength service if the newly-added wavelength service currently to be commissioned reaches its target power;

adjusting power of the newly-added wavelength service currently to be commissioned to its target power when the newly-added wavelength service currently to be commissioned reaches its target power and the end-to-end performance of the existing wavelength service meets its lowest threshold requirement;

when each newly-added wavelength service reaches its respective target power and the end-to-end performance of the existing wavelength service does not meet its lowest threshold requirement and the end-to-end performance of each newly-added wavelength service meets its respective lowest threshold requirement, lower the target power of each newly-added wavelength service by a second preset value to obtain new target power of each newly-added wavelength service; and return to an operation of calculating, if each newly-added wavelength service reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to meet their respective lowest threshold requirements.

7. The optical network system according to claim 6, wherein the first network element is further configured to:

monitor power of existing wavelength services, calculate average power of the existing wavelength services according to a detection result of the first network element, use power which is lower than the average power by a preset ratio as the initial power, and add one or more wavelength services according to the initial power; or use power which is lower than typical power of an optical amplifier board in a first network element by a preset ratio as the initial power, and to add one or more wavelength services according to the initial power; and the typical power is standard output power of the optical amplifier board in the first network element.

8. The optical network system according to claim 7, wherein the second network element is further configured to:

detect the power of each newly-added wavelength service and separately calculate the target power of each newly-added wavelength service according to a detected value detected by the second network element, the initial power, and the average power; or detect the power of each newly-added wavelength service and separately calculate the target power of each newly-added wavelength service according to a detected value detected by the second network element, the initial power, and the typical power.

9. The optical network system according to claim 6, the second network element is further configured to:

when each newly-added wavelength service reaches its respective target power and the end-to-end performance of the existing wavelength service meets its lowest threshold requirement and there is a certain newly-added wavelength service whose end-to-end performance does not meet its lowest threshold requirement, disable the newly-added wavelength service whose end-to-end performance does not meet its lowest threshold requirement, or raise target power of the newly-added wavelength service whose end-to-end performance does not meet its lowest threshold requirement by a first preset value to obtain new target power of the newly-added wavelength service whose end-to-end performance does not meet its lowest threshold requirement; and return to an operation of calculating, if each newly-added wavelength service reaches its respective target power, the end-to-end performance of the existing wavelength service and the end-to-end performance of each newly-added wavelength service, and end the operation till the end-to-end performance of the existing wavelength service and the end-to-end performance of each newly-added wavelength service meet or fail to their respective lowest threshold requirements.

10. The optical network system according to claim 6, the second network element is further configured to:

when the newly-added wavelength service currently to be commissioned reaches its target power and the end-to-end performance of the existing wavelength service does not meet its lowest threshold requirement, disable the newly-added wavelength service currently to be commissioned, or lower target power of the newly-added wavelength service currently to be commissioned by a third preset value to obtain new target power of the newly-added wavelength service currently to be commissioned; and return to an operation of calculating, if the newly-added wavelength service currently to be commissioned reaches its target power, the end-to-end performance of the existing wavelength service, till the end-to-end performance of the existing wavelength service meets its lowest threshold requirement.

* * * * *